United States Patent
Wang

(10) Patent No.: US 6,398,185 B1
(45) Date of Patent: Jun. 4, 2002

(54) WATER FLOW TIMER

(76) Inventor: Hsin-Fa Wang, No. 68, Mou Tan Lane, Shao An Li, Lu Kang Town Chang Hua Hsien (TW)

(*) Notice: Subject to any disclaimer, the term of this patent is extended or adjusted under 35 U.S.C. 154(b) by 0 days.

(21) Appl. No.: 09/729,121

(22) Filed: Dec. 4, 2000

(51) Int. Cl.[7] ............................. F16K 31/44; F16K 1/00
(52) U.S. Cl. ........................ 251/249; 257/331; 257/901
(58) Field of Search ................................. 251/249, 248, 251/331, 346, 901; 222/638, 639

(56) References Cited

U.S. PATENT DOCUMENTS

| | | | | |
|---|---|---|---|---|
| 4,372,354 A | * | 2/1983 | Moore | 141/361 |
| 5,649,562 A | * | 7/1997 | Sturman et al. | 137/119.04 |
| 6,050,286 A | * | 4/2000 | Kruer et al. | 137/119.03 |
| 6,084,504 A | * | 7/2000 | Roche et al. | 340/309.15 |
| D445,347 S | * | 7/2001 | Wang | D10/49 |
| 6,257,264 B1 | * | 7/2001 | Sturman et al. | 137/1 |

* cited by examiner

Primary Examiner—William C. Doerrle
Assistant Examiner—David A Bonderer
(74) Attorney, Agent, or Firm—Harrison & Egbert

(57) ABSTRACT

A water flow timer including a main body, a water stopping membrane, a control rod, a bottom cover, a control member, a rotating member, a timing member, and a rotary cap. The timer is mechanically operated in such a way that the rotary cap is turned to actuate the control member to force the control rod to slide, thereby resulting in a gap between the water stopping membrane and a bottom opening of an inner chamber of the main body. The inner and the outer chamber of the main body are thus in communication with each other. As the rotary cap is turned, the torsion spring of the timing member is compressed to provide the rotary cap with a recovery force. The recovery of the rotary cap is delayed by an intermittent gear, so as to control the timing of the water flow.

4 Claims, 8 Drawing Sheets

WATER FLOW TIMER

BACKGROUND OF THE INVENTION

1. Field of the Invention

The present invention relates generally to a timer, and more particularly to a water flow timer.

2. Description of Related Art

The conventional water flow timer is electronically operated and is therefore rather expensive. In addition, such electronically-operated water flow timers are generally designed for use in a large-scale irrigation of a golf course, farm, or the like. In other words, the conventional water flow timer is not suitable for use as a household item in terms of price and performance.

BRIEF SUMMARY OF THE INVENTION

The primary objective of the present invention is to provide an inexpensive water flow timer.

It is another objective of the present invention to provide a water flow timer which is intended for use in a small-scale irrigation.

It is still another objective of the present invention to provide a mechanically-operated water flow timer.

The features, functions, and advantages of the present invention will be readily understood upon a thoughtful deliberation of the following detailed description of the present invention with reference to the accompanying drawings.

DETAILED DESCRIPTION OF THE INVENTION

Figure 1:
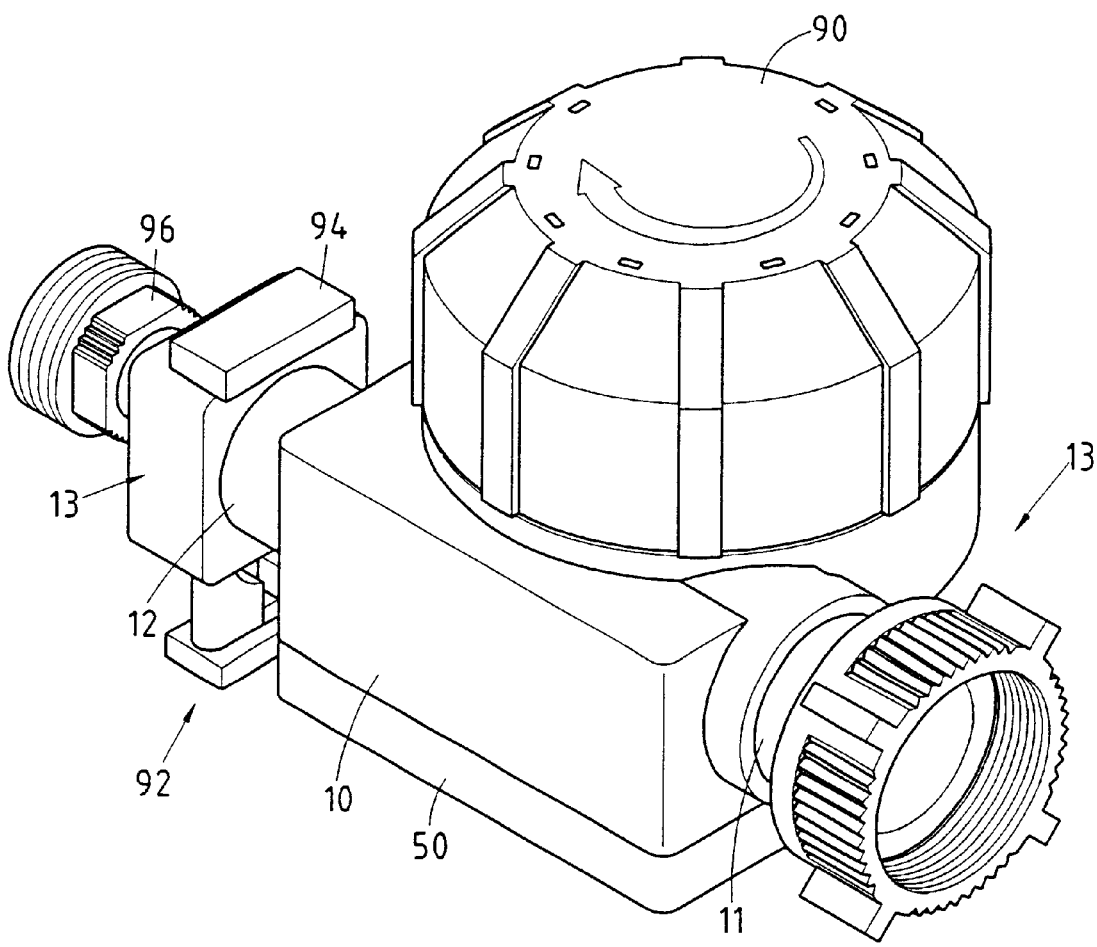
FIG. 1 shows a perspective view of the present invention.
Figure 2:
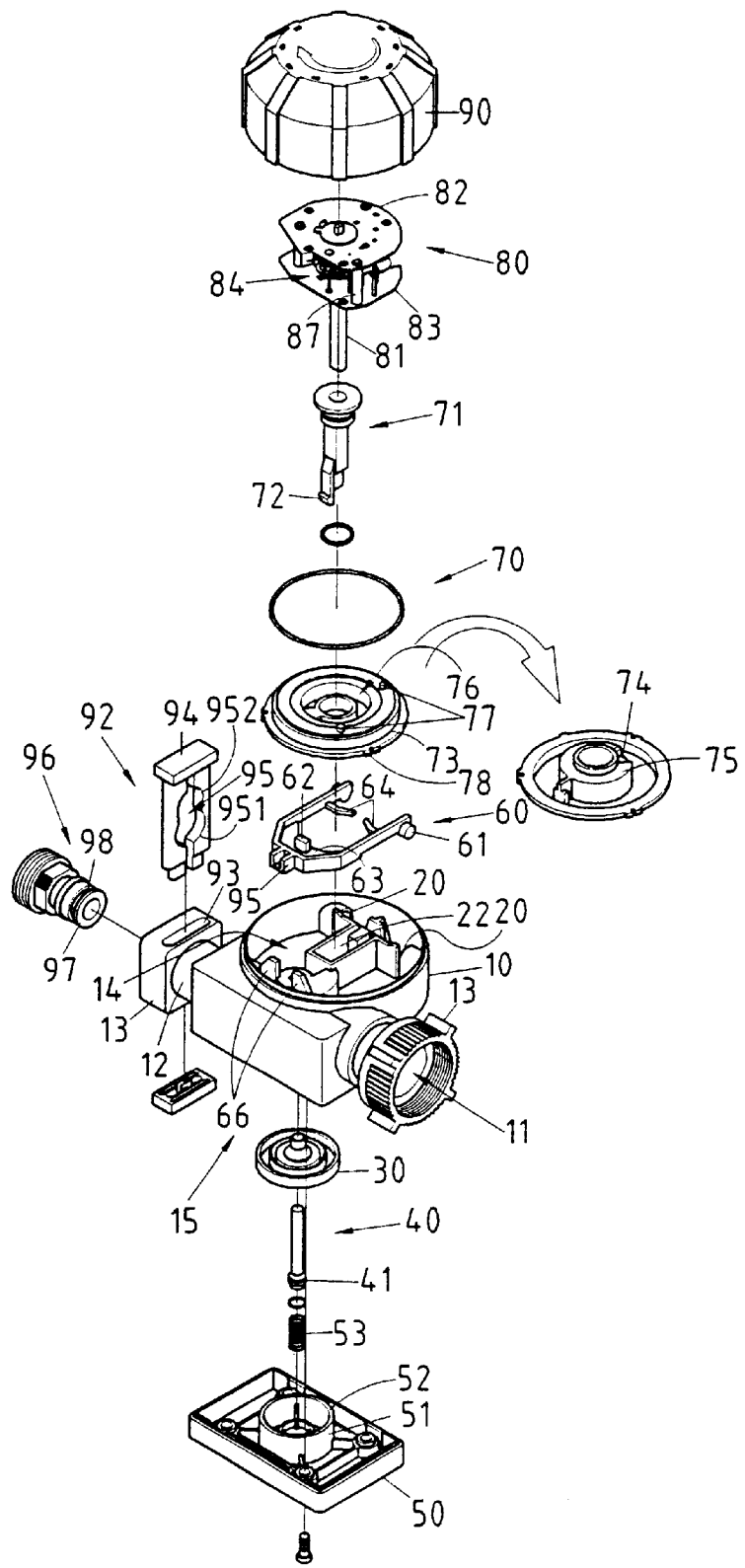
FIG. 2 shows an exploded perspective view of the present invention.
Figure 3:
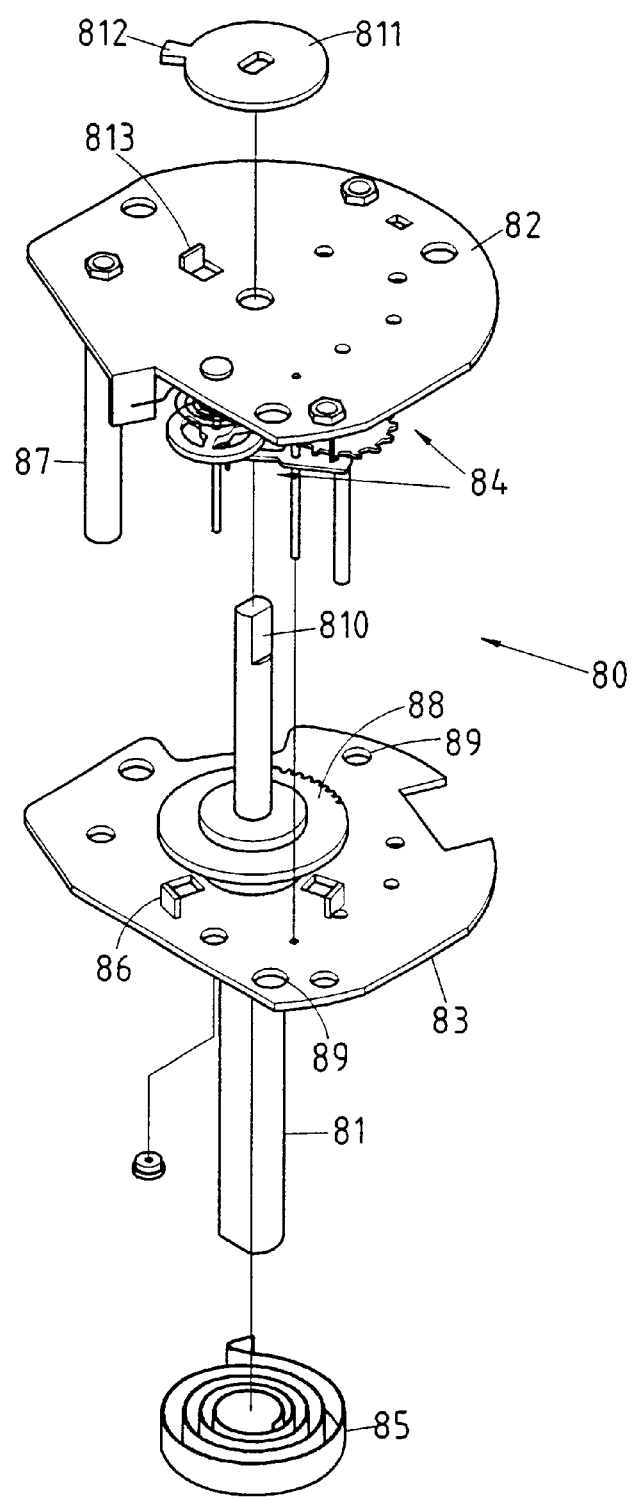
FIG. 3 shows a partial exploded view of the present invention.

As shown in FIGS. 1–8, a water flow timer of the present invention comprises a main body 10, a water stopping membrane 30, a control rod 40, a bottom cover 50, a control member 60, a rotating member 70, a timing member 80, and a rotary cap 90.

The main body 10 is provided with a water admitting tube 11 and a water discharging tube 12, which are in turn provided with respective fastening portions 13 engageable with a water pipe. The main body 10 is further provided with an upper chamber 14 and a lower chamber 15. The lower chamber 15 is provided with a water control tank 16 which is located at the juncture of the water admitting tube 11 and the water discharging tube 12 and is divided into an inner chamber 17 and an outer chamber 18. The inner chamber 17 is provided with a through hole 19 in communication with the upper chamber 14. The upper chamber 14 is provided with at least two pivoting holes 20 and a locating slot 22 having a retaining hook 21.

The water stopping membrane 30 is disposed at the bottom of the inner chamber 17 and the outer chamber 18 such that the top of the water stopping membrane 30 removably seals off a bottom opening 31 of the inner chamber 17. As a result, the inner chamber 17 and the outer chamber 18 can be separated from each other or kept in communication with each other. The periphery of the water stopping membrane 30 is in intimate contact with the inner wall of the water control tack 16.

The control rod 40 is pivoted to the center of the water stopping membrane 30 such that the top end of the control rod 40 juts out of the upper chamber 14 via the through hole 19 of the top of the inner chamber 17. The control rod 40 has a bottom end which is provided with a stop portion 41 urging the underside of the water stopping membrane 30.

The bottom cover 50 serves to seal off the bottom of the lower chamber 15 such that a top edge 52 of the center tube 51 is located at the underside of the water stopping membrane 30, and such that a spring 53 is disposed between the underside of the center of the center tube 51 and the stop portion 41 of the control rod 40.

The control member 60 has two pivoting shafts 61 and is pivoted in the upper chamber 14 such that the two pivoting shafts 61 are received in the two pivoting holes 20 of the upper chamber 14. The control member 60 is provided with a press plate 63 which is provided in the top thereof with a protruded block 62 and is opposite in location to the pivoting shafts 61. The press plate 63 is located over the top end of the control rod 40. The control member 60 is further provided with two elastic support arms 64 which are disposed between the two pivoting shafts 61 and the press plate 63 such that the support arms 64 are disposed across the slot opening 23 of the locating slot 22 of the upper chamber 14, thereby enabling the press plate 63 of move up and down in a reciprocating manner.

The rotating member 70 has a locating shaft 71 capable of being retained in the locating slot 22 of the upper chamber 14. The locating shaft 71 is provided with an inverted hook 72 corresponding in location to the retaining hook 21 of the locating slot 22. The rotating member 70 further has a rotary disk 73 which is provided in the bottom with an annular protrusion 75 having a recess 74 and corresponding in location to the protruded block 62 of the control member 60. The rotary disk 73 is provided in the top with an annular groove 76 and a plurality of locating pillars 77. The rotary disk 73 is further provided in the periphery with a plurality of locating edges 78.

The timing member 80 is formed of an orienting shaft 81, an upper frame 82, a lower frame 83, an intermittent gear set 84, and a torsion spring 85. The torsion spring 85 is disposed at the bottom of the lower frame 83 such that the inner end of the torsion spring 85 is fixed with the orienting shaft 81, and such that the outer end of the torsion spring 85 is retained by a protruded plate 86 of the lower frame 83. The intermittent gear set 84 is pivoted to the pivoting pillars 87 located between the upper frame 82 and the lower frame 83. The orienting shaft 81 is provided with a center gear 88, which is engaged with the intermittent gear set 84. The bottom segment of the orienting shaft 81 is inserted into an orienting slot 79 of the orienting shaft 71. The locating pillars 77 of the rotary disk 73 are received in the locating holes 89 of the lower frame 83.

The rotary cap 90 is provided with a plurality of retaining slots 91 and is joined with the rotary disk 73 such that the locating edges 78 of the rotary disk 73 are retained in the retaining slots 91 of the rotary cap 90. The rotary cap 90 serves to shield the rotary disk 73 and the timing member 80.

Figure 9:
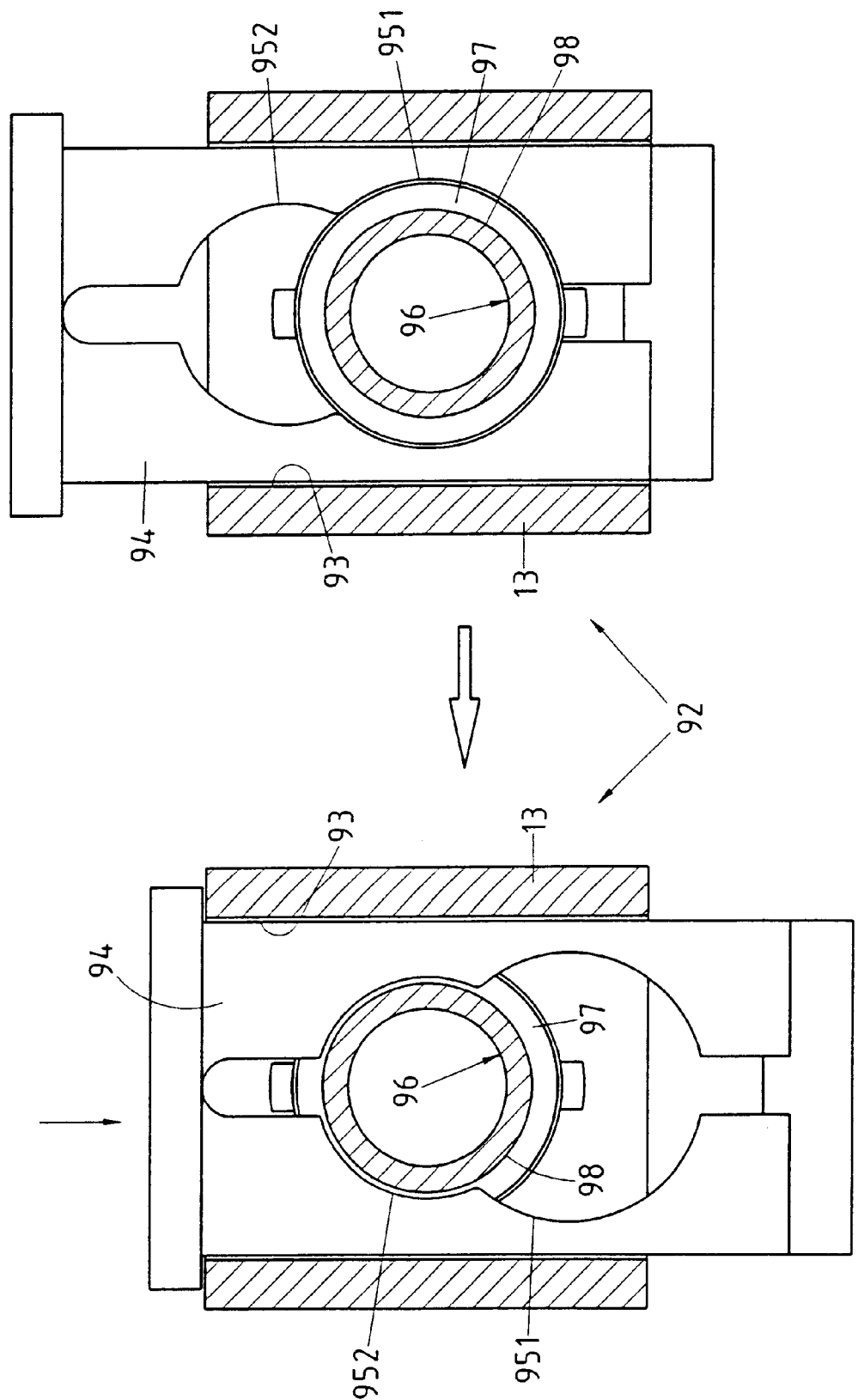
FIG. 9 shows a partial sectional view of the present invention.

The fastening portion 13 of the water discharging tube 12 and the water admitting tube 11 is provided with a fast dismantling device 92. The water discharging tube 12 and the water admitting tube 11 are provided with a radially-oriented guide slot 93 for disposing a locating plate 94 which is provided with a through hole 93 having a large diametrical portion 951 and a small diametrical portion 952. A joint 96 is provided with a large diametrical head 97 and a small diametrical slot 98, which are corresponding to the large diametrical portion 951 and the small diametrical portion 952 of the through hole 95 of the locating plate 94. As the locating plate 94 slides upward, the large diametrical portion 951 is joined with the large diametrical head 97. As the locating plate 94 slides downward, the small diametrical portion 952 of the locating plate 94 is retained in the small diametrical slot 98 of the joint 96, as illustrated in FIG. 9.

The press plate 63 of the control member 60 is further provided with a protuberance 65 opposite in location to the pivoting shafts 61 of the control member 60. The upper chamber 14 is provided with two stop plates 66 between which the protuberance 65 is confined.

The upper frame 82 of the timing member 80 is provided with a notched side 810 for joining a link plate 811. The link plate 811 is provided in one side with a protruded edge 812. When the orienting shaft 81 is kept in its original state, a stop plate 813 of the protruded edge 812 of the link plate 811 acts to stop the upper frame 82, thereby locating the orienting shaft 81 in motion.

Figure 4:
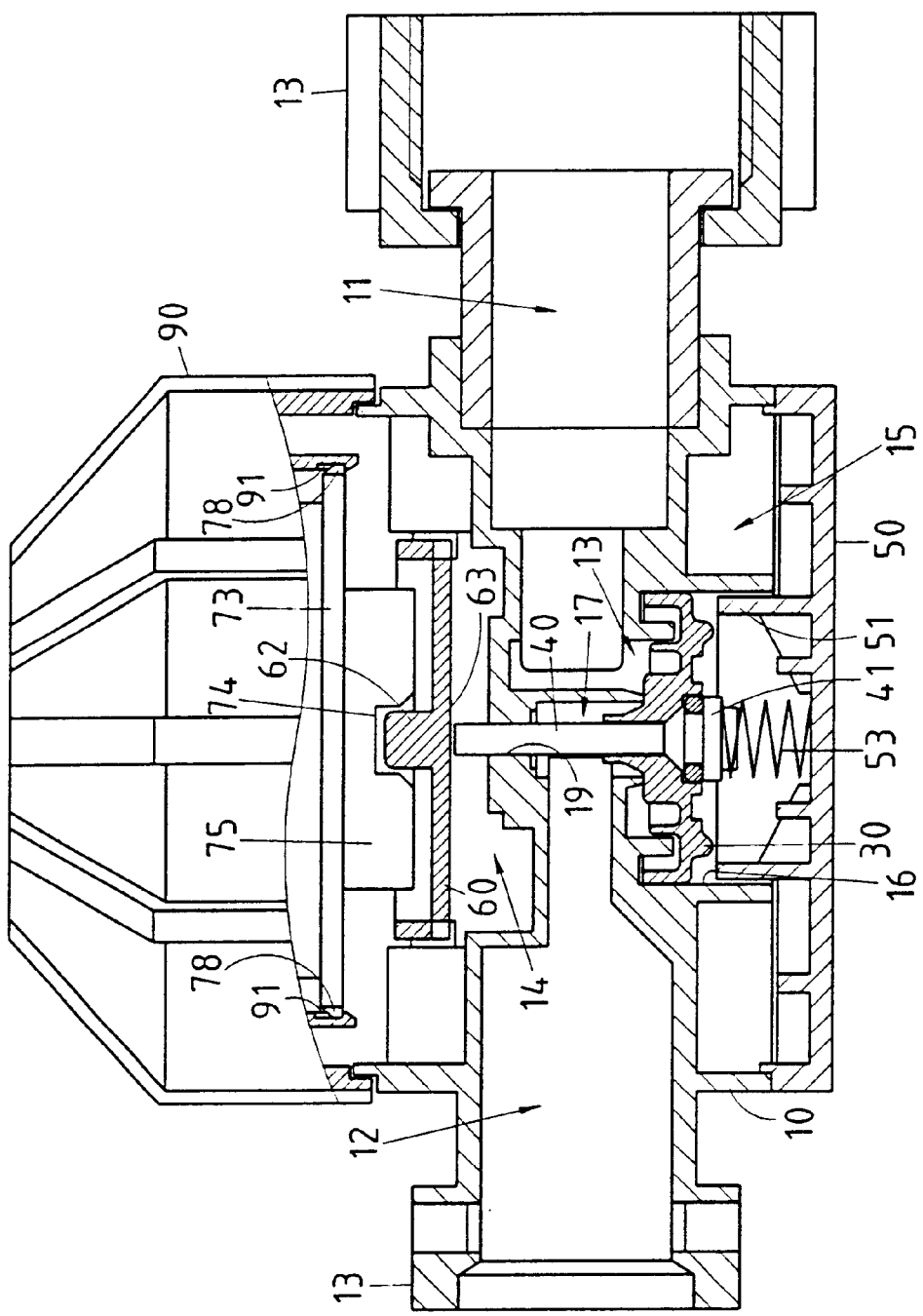
FIGS. 4–7 are sectional views of the present invention.
Figure 5:
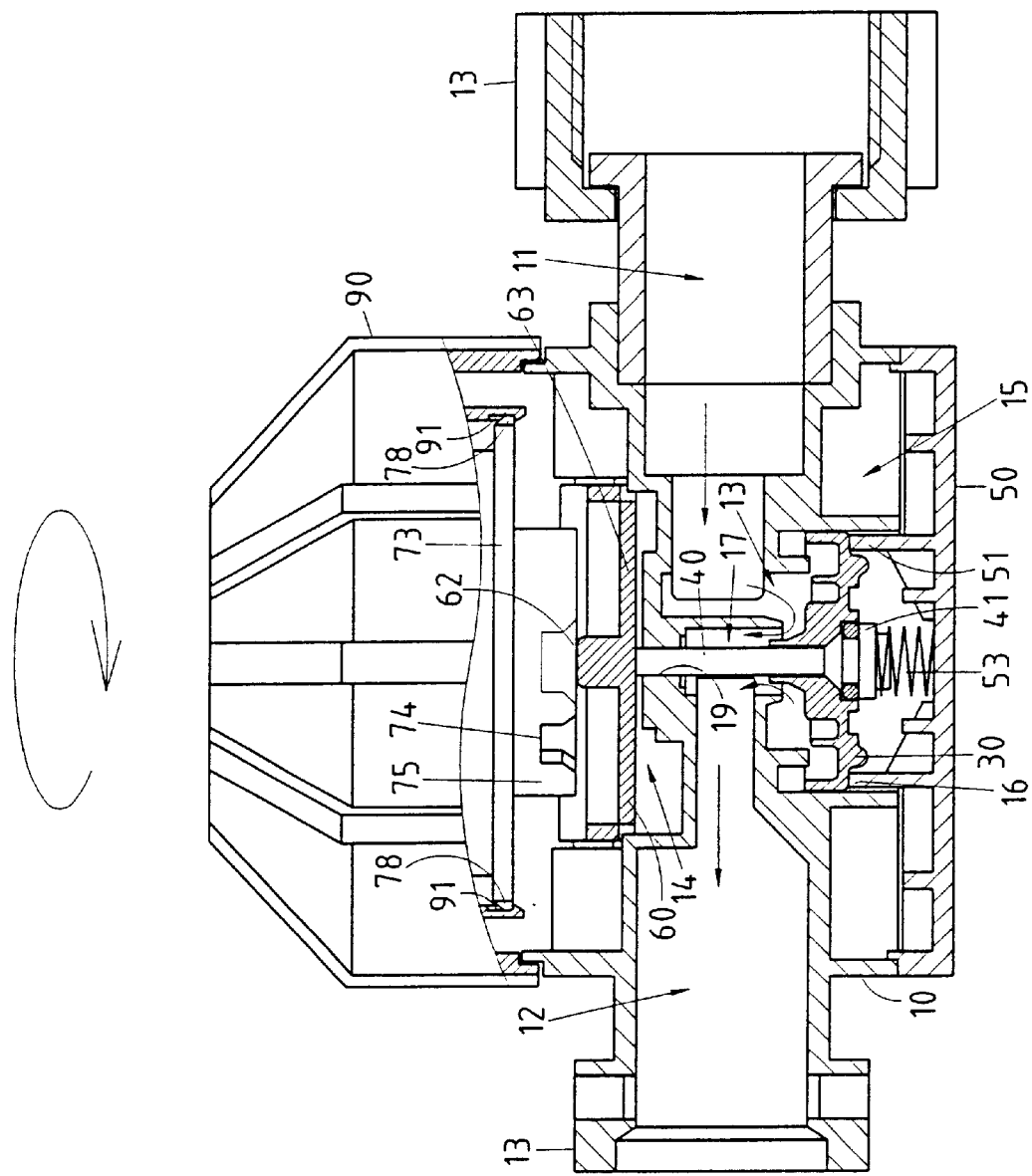
Figure 6:
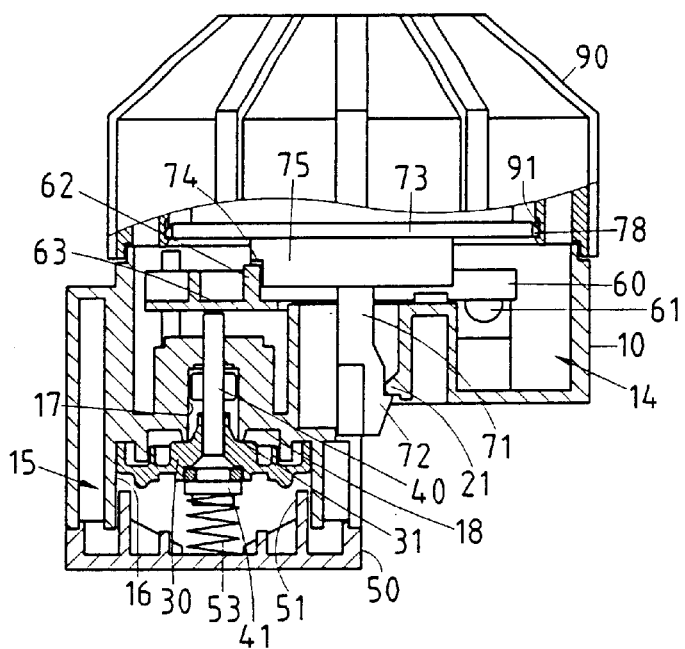
Figure 7:
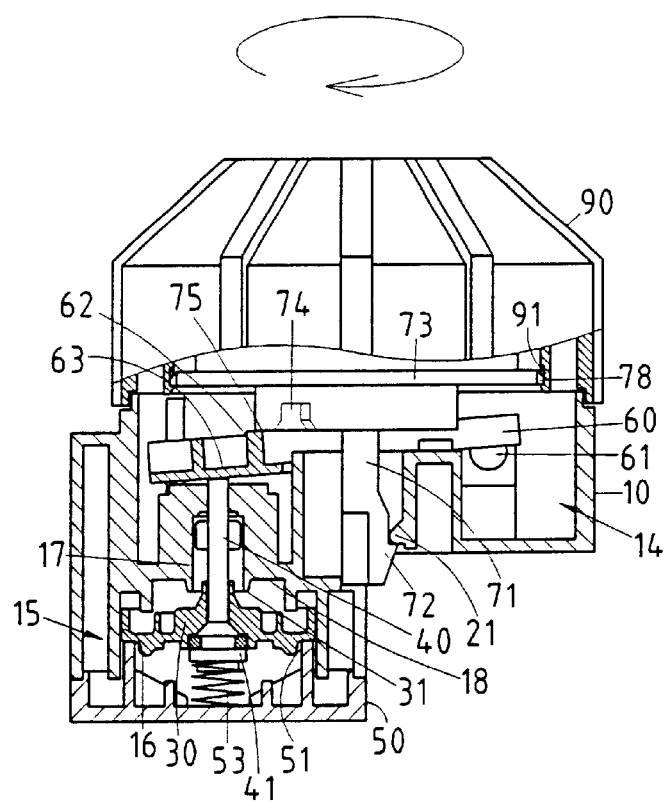
Figure 8:
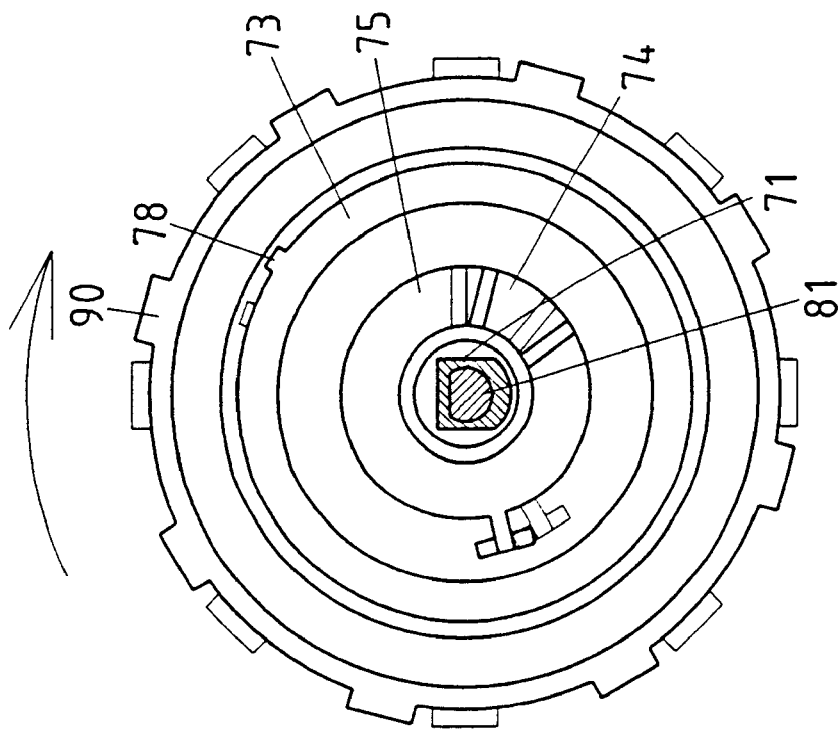
FIG. 8 shows a partial schematic plan view of the present invention.
Figure 8:
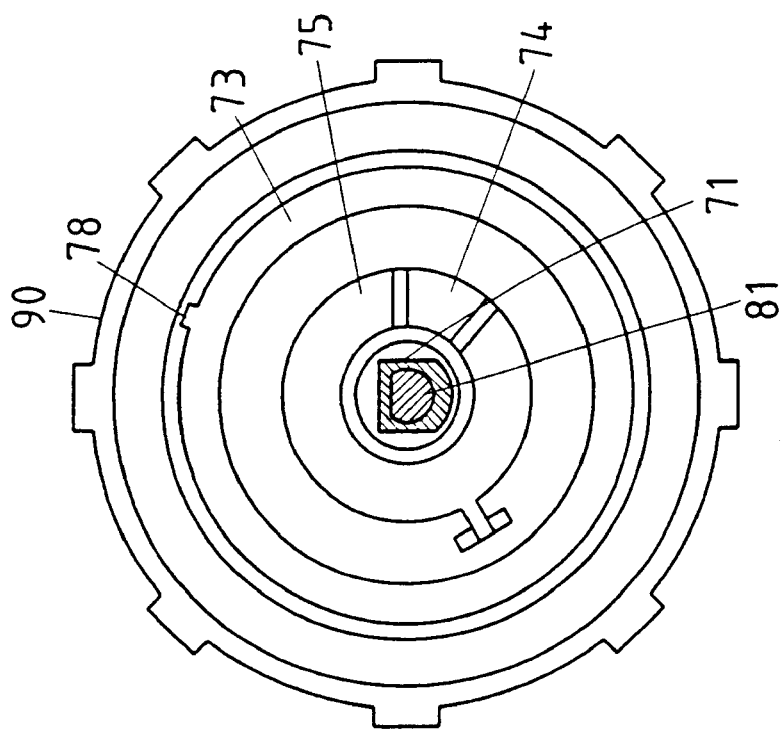

When the rotary cap 90 is not set in a timing state, the protruded block 62 of the control member 60 is received in the recess 74 of the annular protrusion 75 of the rotating member 70, thereby causing the press plate 63 of the control member 60 to be raised. As a result, the top end of the control rod 40 is no longer pressed by the press plate 63 such that the control rod 40 is urged by the spring 53, and that the top of the water stopping membrane 30 seals off the bottom opening 31 of the inner chamber 17, thereby resulting in separation of the inner chamber 17 from the outer chamber 18 and interruption of water flow, as shown in FIGS. 4, 6, and 8. When the rotary cap 90 is so turned as to set in a timing state, the protruded block 62 of the control member 60 is pressed by the annular protrusion 75 of the rotary disk 73 such that the press plate 63 of the control member 60 is pressed downward, and that the top end of the control rod 40 is pressed by the press plate 63 of the control member 60 to slide downward, thereby resulting in formation of a gap between the top of the water stopping member 30 and the bottom opening 31 of the inner chamber 17, as shown in FIGS. 5, 7, and 8. The inner chamber 17 and the outer chamber 18 are no longer separated from each other. As the rotary cap 90 is turned, the torsion spring 85 is wound to provide the rotary cap 90 with a spring force enabling the rotary cap 90 to return to its original position. However, the returning of the rotary cap 90 to its original position is delayed by the intermittent gear set 84.

I claim:

1. A water flow timer comprising:

a main body having a water admitting tube and a water discharging tube, each of said water admitting tube and said water discharging tube having a fastening portion engageable with a water pipe, said main body having an upper chamber and a lower chamber, said lower chamber having a water control tank located at a juncture of said water admitting tube and said water discharging tube, said water control tank being divided into an inner chamber and an outer chamber, said inner chamber having a through hole in communication with said upper chamber, said upper chamber having at least two pivoting holes and a locating slot having a retaining hook;

a water stopping membrane disposed at a bottom of said inner chamber and said outer chamber such that a top of said water stopping membrane removably seals off a bottom opening of said inner chamber, said inner chamber and said outer chamber being separated from each other or in communication with each other, said water stopping membrane being in intimate contact with an inner wall of said water control tank;

a control rod pivotably connected to a center of said water stopping membrane such that a top end of said control rod juts out of said upper chamber through said through hole of said inner chamber, said control rod having a stop portion at a bottom end thereof, said stop portion urging against an underside of said water stopping membrane;

a bottom cover sealing off a bottom of said lower chamber such that a top edge of a center tube of said bottom cover is positioned at said underside of said water stopping membrane;

a spring disposed between an underside of a center of said center tube and said stop portion of said control rod;

a control member having two pivoting shafts pivotally received in said upper chamber such that said two pivoting shafts are respectively received in said two pivoting holes of said upper chamber, said control member having a press plate provided in a top thereof, said press plate having a protruded block located over said top end of said control rod, said control rod having two elastic support arms disposed between said two pivoting shafts and said press plate such that said two elastic support arms are disposed across a slot opening of said locating slot of said upper chamber so as to enable said press plate to move upwardly and downwardly in a reciprocating manner;

a rotating member having a locating shaft which is retainable within said locating slot of said upper chamber, said locating shaft having an inverted hook corresponding in location to said retaining hook of said locating slot, said rotating member having a rotary disk having an annular protrusion with a recess formed in a bottom thereof, said annular protrusion corresponding in location to said protruded block of said control member, said rotary disk having an annular groove and a plurality of locating pillars formed in a top thereof, said rotary disk having a pair of locating edges formed in a periphery thereof;

a timing member having an orienting shaft, an upper frame, a lower frame, an intermittent gear set, and a torsion spring, said torsion spring being disposed at a bottom of said lower frame such that an inner end of said torsion spring is fastened to said orienting shaft, an outer end of said torsion spring being retained by a protruded plate of said lower frame, said intermittent gear set being pivotally connected to a plurality of pivoting pillars positioned between said upper frame and said lower frame, said orienting shaft having a center gear which is engaged with said intermittent gear set; and a rotary cap having a plurality of retaining slots, said rotary cap being joined with said rotary disk such that said locating edges of said rotary disk are respectively retained in said plurality of retaining slots of said rotary cap, said protruded block of said control member being receivable in said recess of said annular protrusion of said rotating member so as to cause said press plate of said control member to be raised such that said top end of said control rod is no longer pressed by said press plate of said control member, said control rod being urged by said spring, said top of said water stopping membrane sealing off said bottom opening of said inner chamber so as to separate said inner chamber from said outer chamber, said protruded block of said control member being pressable by said annular protrusion of said rotary disk of said rotating member when said rotary cap causes said press plate of said control member to be pressed downwardly such that said top end of said control rod is pressed by said press plate of said control member so as to slide downwardly to form a gap between said top of said water stopping membrane and said bottom opening of said inner chamber, said inner chamber being in communication with said outer chamber such that said torsion spring is compressed so as to provide said rotary cap with a recovery force when the rotary cap is turned.

2. The water flow timer of claim 1, said water admitting tube and said water discharging tube being provided with a radially-oriented guide slot, said guide slot receiving a locating plate which is provided with a through hole having a large diametrical portion and a small diametrical portion, said main body having a joint which is provided with a large diametrical head and a small diametrical slot such that said large diametrical head is joined with said large diametrical portion of said locating plate when said locating plate slides upwardly, said small diametrical portion of said locating plate being retained is said small diametrical slot of said joint when said locating plate slides downwardly.

3. The water flow timer of claim 1, said press plate of said control member being provided with a protuberance opposite to said pivoting shafts of said control member, said upper chamber having two stop plates, said protuberance of said press plate of said control member being confined between said two stop plates.

4. The water flow timer of claim 1, said upper frame of said timing member having a notched side joinable to a link plate, said link plate having a protruded edge stopping a movement of said upper frame.

* * * * *